United States Patent
Hein et al.

(10) Patent No.: US 8,292,240 B2
(45) Date of Patent: Oct. 23, 2012

(54) STAND, IN PARTICULAR CAMERA STAND

(75) Inventors: Dieter Hein, Windach-Hechenwang (DE); Dagmar Wessels, Munich (DE)

(73) Assignee: Camera Dynamics GmbH, Eching (DE)

( * ) Notice: Subject to any disclaimer, the term of this patent is extended or adjusted under 35 U.S.C. 154(b) by 254 days.

(21) Appl. No.: 12/763,912

(22) Filed: Apr. 20, 2010

(65) Prior Publication Data

US 2010/0282921 A1    Nov. 11, 2010

(30) Foreign Application Priority Data

May 11, 2009   (EP) ..................................... 09159870

(51) Int. Cl.
*F16M 11/00*   (2006.01)
(52) U.S. Cl. ..... 248/161; 248/168; 248/169; 248/177.1; 248/187.1; 248/125.8; 396/419; 396/428
(58) Field of Classification Search ............... 248/125.8, 248/161, 163.1, 168, 169, 170, 177.1, 178, 248/188, 187.1; 396/419, 428
See application file for complete search history.

(56) References Cited

U.S. PATENT DOCUMENTS

| | | | |
|---|---|---|---|
| 4,695,021 A | | 9/1987 | Leinfelder |
| 4,767,090 A | * | 8/1988 | Hartman et al. ............. 248/168 |
| 5,887,835 A | * | 3/1999 | Hein et al. .................... 248/161 |
| 6,082,685 A | * | 7/2000 | Hein et al. .................... 248/161 |
| 6,286,795 B1 | * | 9/2001 | Johnson ........................ 248/168 |
| 6,631,877 B1 | * | 10/2003 | Crain et al. .................... 248/168 |
| 2009/0072100 A1 | * | 3/2009 | Zierer et al. .................. 248/169 |
| 2010/0064739 A1 | * | 3/2010 | Lu ..................................... 70/57 |

FOREIGN PATENT DOCUMENTS

| | | |
|---|---|---|
| DE | 202007012585 U1 | 1/2008 |
| EP | 0 813 021 B1 | 12/1997 |
| WO | WO 02/10635 A1 | 2/2002 |

OTHER PUBLICATIONS

Search Report dated Oct. 28, 2009 from corresponding European Application No. 09159870.6.

* cited by examiner

*Primary Examiner* — Amy Sterling
*Assistant Examiner* — Todd M Epps
(74) *Attorney, Agent, or Firm* — Wolf, Greenfield & Sacks, P.C.

(57) ABSTRACT

Stand, in particular camera stand, comprising: a receptacle for mounting an apparatus, in particular a camera; and at least one leg which is connected to the receptacle and comprises at least two telescopic units (T1, T2), of which a first telescopic unit (T1) is connected to the receptacle and a second telescopic unit (T2) is displaceable relative to the first telescopic unit and can be locked in a desired position in relation to the first telescopic unit (T1), characterized in that two locking points set apart in the longitudinal direction of the leg are provided between the second telescopic unit (T2) and the first telescopic unit (T1) for locking the telescopic units (T1, T2).

16 Claims, 7 Drawing Sheets

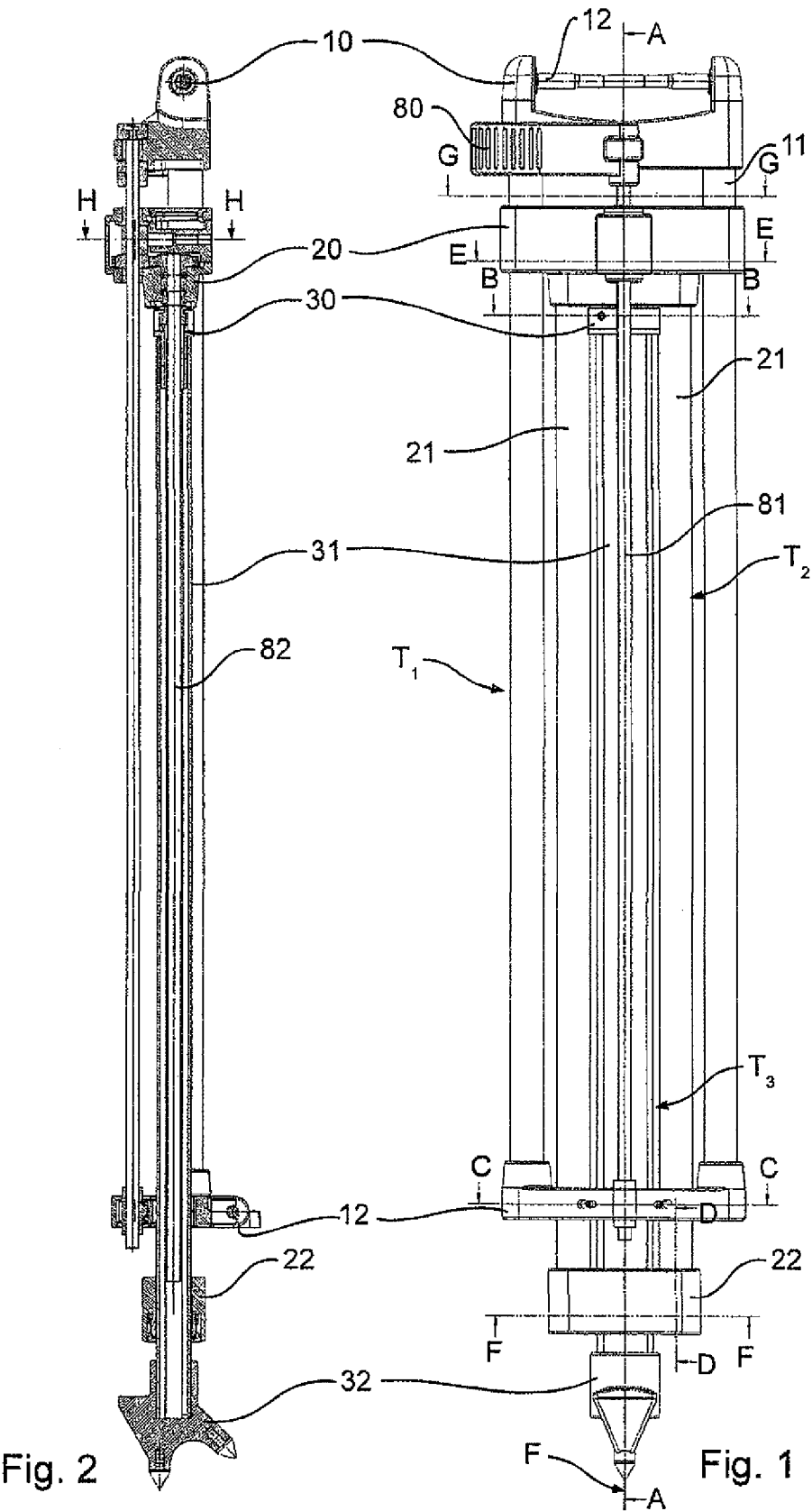

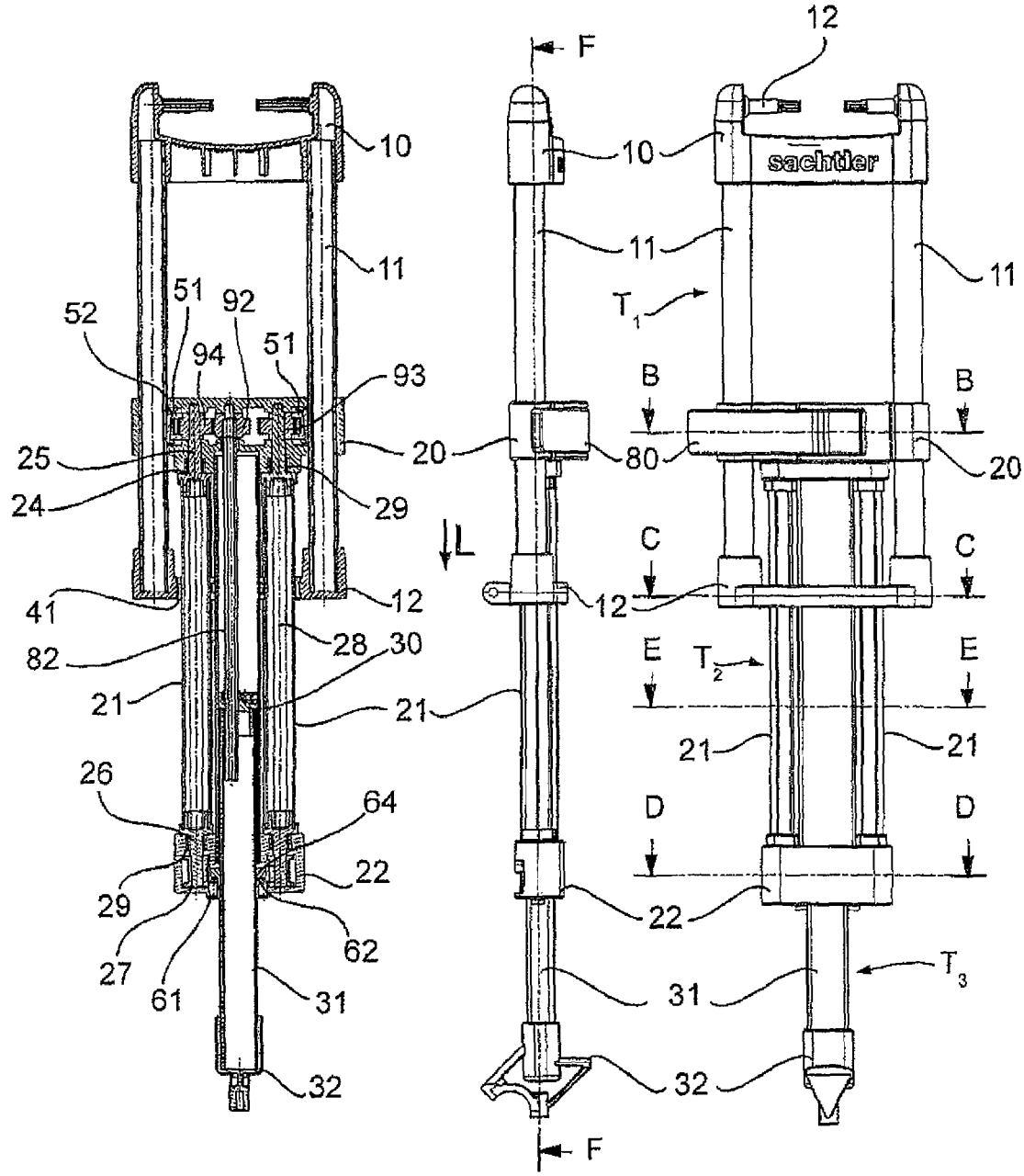

STAND, IN PARTICULAR CAMERA STAND

TECHNICAL FIELD

The present invention relates to a stand and in particular to a camera stand having the features of the preamble of claim 1.

BACKGROUND OF THE INVENTION

A stand of this type is known as a telescopic stand with two telescopic units from DE 20 2007 012 585 U1 and with three telescopic units from EP 0 813 021 B1.

If the stand is twisted by pivoting the camera, then a deformation is produced in the individual stand leg. As a result of the secure connection to the ground, a force is exerted in the region of the foot of the stand leg perpendicularly to the longitudinal extension of the stand leg. As a result, the stand leg is bent out of its initial position perpendicularly to its longitudinal extension by a certain amount X. This can occur, for example, when the stand is rotated, when the feet of the stand are on the ground or even a form-fitting engagement exists between the feet and the ground.

ACCOUNT OF THE INVENTION

The object of the present invention consists in providing a stand of the type mentioned at the outset in which the bending of the stand legs perpendicularly to their longitudinal extension at a predefined force is reduced.

This object is achieved by a stand having the features of claim 1. Advantageous developments of the present invention may be inferred from the sub-claims.

The present invention is based on the idea of carrying out the locking between two telescopic units not in the conventional manner at just one point, but at least two points set apart in the longitudinal direction of the legs. In a two-stage telescopic leg with two telescopic units, this leads to two locking points, in a three-stage leg with three telescopic units to four or more clamping points, etc.

Accordingly, a stand of the present invention, which is in particular a camera stand, has a receptacle for mounting an apparatus, in particular a camera. It should be noted in this regard that the apparatus can be connected to the receptacle or fastened thereto either directly or indirectly. In this case, it is conventional to connect various types of camera heads and comparable elements to the receptacle, so that the camera is mounted indirectly via the camera head in the receptacle. Furthermore, the stand of the present invention comprises at least one leg which is connected to the receptacle. Three-leg stands with three legs of this type, which preferably each have the same configuration, are particularly preferred in this regard. However, implementation is also conceivable in one-leg stands. The legs are in this case preferably articulated to the receptacle, so that the legs can be pivoted from a transport position into one or more operating positions. In addition, the leg(s) is/are telescopic and comprise(s) at least two telescopic units, of which a first telescopic unit is connected to the receptacle and a second telescopic unit is displaceable relative to the first telescopic unit and can be locked in a desired position in relation to the first telescopic unit. In this case, it is preferable for the displaceability and lockability of the telescopic units in relation to one another to be possible progressively. The stand according to the invention is distinguished in particular in that two locking points set apart in the longitudinal direction of the leg are provided between the second telescopic unit and the first telescopic unit for locking the telescopic units. In other words, the two telescopic units are locked in relation to each other at two points set apart from each other in the longitudinal direction. In this case, the locking is carried out preferably with frictional engagement or in a force-transmitting manner and in particular by a clamping connection, so that the locking points are also said to be clamping points. However, on the other hand, form-fitting or combinations of form-fitting and force-transmitting lockings are also conceivable. The two locking points, which are set apart in the longitudinal direction, increase the stability of the leg, in particular in a direction perpendicular to the longitudinal extension of the leg, and thus the rigidity thereof. As a result, it is possible to reduce, at a predefined force, the amount of the bending of the leg compared to stands mentioned at the outset.

The inventive approach has a particularly advantageous effect in three-stage telescopic stands in which the leg furthermore has a third telescopic unit which is displaceable, in the same manner as the second in relation to the first telescopic unit, in relation to the second telescopic unit and can be locked in a desired position in relation to the second telescopic unit, two locking points set apart in the longitudinal direction of the leg being provided in this case too between the third telescopic unit and the second telescopic unit for locking the telescopic units. In this configuration, the amount X could be reduced, at a predefined force, even by a multiple compared to the prior art.

Preferably, the first telescopic unit has a connecting piece for connecting, preferably in an articulated manner, to the receptacle, a first crossmember and a first elongate leg portion which is connected to the connecting piece and the first crossmember. In this case, the first leg portion runs in the longitudinal direction of the leg, whereas the connecting piece and the first crossmember run transversely to the longitudinal direction of the leg. In addition, it is preferable for the leg portion to be formed from two first telescopic tubes arranged parallel to and at a distance from each other in the transverse direction of the leg. Furthermore, the second telescopic unit comprises a second crossmember which is supported on the first leg portion or the first telescopic tubes for guiding the second telescopic unit, a third crossmember and a second elongate leg portion which is connected to the second and the third crossmember. In this case too, it is preferable for the second elongate leg portion to be formed from two second telescopic tubes which are arranged transversely to the longitudinal direction of the legs, parallel and at a distance and for the second and third crossmembers to extend transversely to the longitudinal direction. In this configuration, it is particularly preferable for a first interlocking point between the first telescopic unit and the second telescopic unit to be formed by a first locking mechanism which is received by the first crossmember, i.e. the first crossmember carries the first locking mechanism. A second locking point between the first telescopic unit and the second telescopic unit is formed by a second locking mechanism which is received by the second crossmember or carried thereby. In particular if the first and second leg portions are formed by set-apart telescopic tubes arranged in parallel, an additional rigidity of the legs is obtained in the desired direction. In addition, the respective crossmembers offer the possibility of providing the locking mechanisms in the simplest manner and preferably in protected form.

As a development of the foregoing embodiment, it is preferable for the third telescopic unit to comprise a foot and a fourth crossmember, which is supported on the second leg portion or the second telescopic tubes for guiding the third telescopic unit, and at least a third elongate leg portion. In this case, the third elongate leg portion can be formed by a third telescopic tube, if appropriate also two third telescopic tubes which are arranged parallel to and at a distance from each other. In this case, a first locking point between the third telescopic unit and the second telescopic unit is formed by a third locking mechanism which is received by the third crossmember or carried thereby and a fourth locking point between the third telescopic unit and the second telescopic unit is formed by a fourth locking mechanism which is received or carried by the fourth crossmember.

It is particularly preferable for an actuation of some, preferably all the, locking mechanisms to be possible from one point despite the plurality of locking points or locking mechanisms. For this purpose, it is preferable to provide a first coupling means which connects the second crossmember to the fourth locking mechanism. This allows the fourth locking mechanism, which acts between the second telescopic unit and the third telescopic unit and is received by the fourth crossmember, also to be actuated from the second crossmember. The coupling means is preferably a bar, in particular a torsion bar, running in the longitudinal direction of the leg or legs. Advantageously, the locking mechanism is actuated by a rotation of the torsion bar. However, alternatively, it is also conceivable to form the coupling means from a limp element, for example a steel cable. Furthermore, it is also conceivable for the coupling means not to be rotated in order to actuate the locking mechanism, but for a translatory movement to be carried out in the longitudinal direction of the legs or transversely thereto.

Furthermore, it is advantageous, in order to protect the first coupling means, on the one hand, and in order to avoid a large number of gaps between the telescopic legs in which objects can become stuck, to accommodate the first coupling means in a housing which surrounds the first coupling means preferably completely and in each telescopic state of the leg, the housing being part of the second leg portion. According to a preferred embodiment, the third leg portion can be guided in this housing, i.e. be supported on this second leg portion.

In addition, it may be preferable also to provide a second coupling means which connects the second crossmember to the third locking mechanism which is received by the third crossmember, so that the third locking mechanism can also be actuated on the third crossmember, which is positioned lower down and is situated above the fourth crossmember, from the second crossmember.

In this case too, it is advantageous, in order to protect the second coupling means, which can be configured similarly to the first coupling means, and in order to avoid gaps, to receive the second coupling means in the second leg portion. In this case, it is particularly preferable to arrange the second coupling means in one of the two second telescopic tubes which are arranged parallel and set apart.

Furthermore, it is preferable for the third and fourth locking mechanisms to be able to be actuated jointly with the first and the second locking mechanism. That means that all four locking points or four locking mechanisms can be actuated at once; this can be achieved preferably via a common handle, for example an actuating lever, actuation of which jointly actuates all the locking mechanisms. In this case, the handle can be configured, in particular in implementation of an actuating lever, in such a way that the actuating lever is divided in two and both common and separate actuation of the locking mechanisms is possible for the individual telescopic stages. In addition, it should be noted that the actuating lever can be configured, as a function of the coupling means used, so as to be pivotable about an axis parallel to the longitudinal extension of the leg or so as to be pivotable about an axis perpendicular thereto. Furthermore, it is also conceivable to use, instead of an actuating lever, a rotatory handle in the form of a rotary knob.

Furthermore, it is preferable to join together also the first and second locking mechanisms via a third coupling means, so that these can also be jointly actuated. In this case, various configurations, such as were described above, are expedient for the third coupling means.

According to one embodiment, a handle or the abovementioned handle can be provided on the second crossmember and interact with the third coupling means in such a way that the first locking mechanism, that in the first crossmember which is located below the second crossmember, can be actuated from the second crossmember. In this embodiment, it is preferable, in order to protect the third coupling means and in order to prevent gaps, to receive the third coupling means in the first leg portion or one of the above-mentioned first telescopic tubes.

Alternatively, in this arrangement of the handle, it may be advantageous to form, on the second crossmember which interacts with the third coupling means, the third coupling means by the second leg portion, in particular one or preferably both second telescopic tubes. For this purpose, the second leg portion, in particular at least one, preferably both second telescopic tubes is/are mounted in the second and third crossmembers movably, preferably rotatably. As a result, an additional element for the third coupling means is avoided and replaced by an element which is present anyway. Additional protection of the third coupling means is not necessary either, as the third coupling means is formed by the second telescopic tubes themselves.

A further alternative is the possibility of providing the handle not on the second crossmember, but rather on the connecting piece which is connected to the receptacle. This allows the locking mechanisms, preferably all of them, to be operated from the top point of the stand; this further improves comfortable handling of the stand. In this case, it is preferable for the second crossmember to be longitudinally displaceable relative to the third coupling means. In this case, the third coupling means preferably runs through the second crossmember in order to be able to actuate the second locking mechanism arranged there.

Furthermore, it is preferable for the handle to be fastened to the third coupling means, for example connected thereto in a form-fitting manner; this is provided in particular when the handle is arranged on the connecting piece. If the handle is provided on the second crossmember, but also in other cases, a transmission means can be provided in order to transmit the movement of the handle, for example the pivoting of the actuating lever, to at least one of the coupling means, preferably two of the or all of the coupling means. If, for example, the handle is arranged on the connecting piece and the third coupling means is fastened thereto, then it may be necessary to transmit the movement of the handle to the first and/or second coupling means either directly from the handle or via the third coupling means. In another embodiment, in which the handle is arranged on the second crossmember, it may also be conceivable for the handle to be moved onto the coupling means only via the transmission means.

In a particular configuration, it may also be possible for the second coupling means to be formed by the third coupling means, thus necessitating just two coupling means.

Further advantages and features of the present invention which can be implemented per se or in combination with one or more of the foregoing features are apparent from the following description of preferred embodiments of the present invention, which will be given with reference to the accompanying drawings.

BRIEF DESCRIPTION OF THE FIGURES

In the drawings:

FIG. 1 is a plan view onto a leg of a stand according to a first embodiment of the present invention;

FIG. 2 is a longitudinal section along the line A-A from FIG. 1;

FIG. 8 is a plan view onto a leg of a stand according to a second embodiment of the present invention;

FIG. 9 is a side view of the leg from FIG. 8;

FIG. 10 is a longitudinal section along the line F-F from FIG. 9;

DESCRIPTION OF PREFERRED EMBODIMENTS

Figure 3:
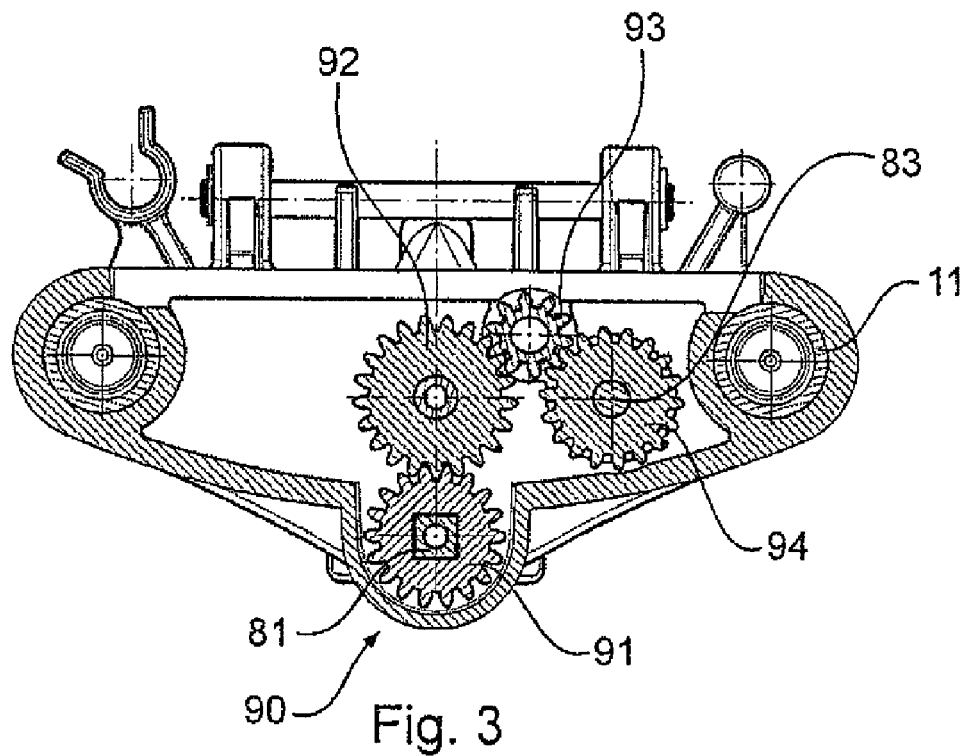
FIG. 3 is a cross section along the line E-E from FIG. 1.

In the following drawings, the same reference numerals have been used for like or comparable elements which, at suitable points, have not been redescribed in order to avoid repetitions.

A first embodiment of the present invention will be described hereinafter with reference to FIGS. 1 to 7.

The leg, illustrated in FIG. 1 and the longitudinal section in FIG. 2, of a stand according to a first embodiment forms one leg of three legs of a stand of this type. The leg is a three-stage telescopic leg with a first telescopic unit T1, a second telescopic unit T2 and a third telescopic unit T3.

The first telescopic unit T1 has a connecting piece 10 with an axis of articulation 12. The axis of articulation 12 serves to connect the connecting piece 10 to the receptacle (not shown) and allows the illustrated leg to pivot relative to the receptacle about the axis 12. Furthermore, the first telescopic unit T1 has two telescopic tubes 11 arranged in the longitudinal direction L of the leg (first leg portion). These telescopic tubes 11 run parallel to each other and transversely to the longitudinal direction L at a distance from each other. For weight reasons, they are in this case preferably configured at least partially hollow cylindrically, although they could also be made of solid material. The material selected is in this case in particular aluminium, carbon or another light material. Furthermore, the first telescopic unit T1 has a first crossmember 12 which is also referred to as a flat slide. The connecting piece 10 and the first crossmember 12 are arranged in the longitudinal direction L at a distance from each other and are joined together by the telescopic tubes 11.

The second telescopic unit T2 has a second crossmember 20 which is arranged between the connecting piece 10 and the first crossmember 12 of the first telescopic unit T1. In this case, the second crossmember 20 is configured in such a way that it is supported on the first telescopic tubes 11. In the illustrated embodiment, this is solved in that the second crossmember 20 runs through the first telescopic tubes 11. As illustrated, this can be achieved in that the second crossmember 20 runs on the first telescopic tubes 11, surrounding these all the way round. However, on the other hand, it is also conceivable for the second crossmember 20 to surround the first telescopic tubes 11 only partially, at the mutually facing sides, and for the guidance to be achieved in this way (see second embodiment). Furthermore, the second telescopic unit T2 has second telescopic tubes 21 (second leg portion). The second telescopic tubes 21 run parallel to each other, and also to the first telescopic tubes 11, and are set apart at a distance transversely to the longitudinal direction L. In the illustrated embodiment, they run between the first telescopic tubes 11 but are, as may be seen from the section in FIG. 5 for example, offset slightly toward the front. Otherwise, the second telescopic tubes 21 are configured in the same manner as the first telescopic tubes 11. Furthermore, the second telescopic unit T2 comprises a third crossmember 22, the second telescopic tubes 21 connecting the second crossmember 20 and the third crossmember 22 to each other.

The third telescopic unit T3 has a fourth crossmember 30 which is supported on the two telescopic tubes 21 on both sides. In this case, the supporting is carried out in such a way that the fourth crossmember 30 is guided through the second telescopic tubes 21. However, unlike in the second crossmember, the second telescopic tubes 21 pass through the fourth crossmember 30 not in such a way as to surround it all the way round; instead, the fourth crossmember surrounds the second telescopic tubes 21, in a manner similar to that illustrated in section in FIG. 4, only partially. However, as a result of the supporting on both sides, sufficient guidance is carried out in this case too. The fourth crossmember 30 is in this case arranged between the second 20 and first 12 crossmember. Furthermore, the third telescopic unit T3 comprises a third telescopic tube 31 (third leg portion) which in cross section is embodied ovally, unlike the circular first and second telescopic tubes, such as may be seen from FIG. 6. In this case, the larger dimension of the oval cross section of the third telescopic tube 31 is such that the third telescopic tube 31 can run between the second telescopic tubes 21 having substantially aligned centre points (see FIG. 5).

Furthermore, the third telescopic unit T3 has a foot 32, the third telescopic tube 31 connecting the fourth crossmember 30 and the foot 32.

The order of the individual elements in the longitudinal direction from the top down is in this case such that the second crossmember 20, the fourth crossmember 30, the first crossmember 12, the third crossmember 22 and the foot 32 follow the connecting piece 10.

According to the invention, two locking points, which are set apart in the longitudinal direction L, are arranged on the first 12 and second 20 crossmember and are implemented by a first 40 and second 50 locking mechanism, are provided between the first telescopic unit T1 and the second telescopic unit T2 which are displaceable relative to each other and can be progressively locked.

The second telescopic unit T2 and the third telescopic unit T3 are likewise displaceable relative to each other and can be progressively locked in a desired position. In this case, the locking is carried out on the third crossmember 22 and the fourth crossmember 30 accordingly by a third 60 and fourth 70 locking mechanism.

In other words, the telescopic units are locked in relation to each other at two respective points which are set apart in the longitudinal direction L, allowing, when force is applied to the foot 32 in the direction F (see FIG. 1), the amount by which the foot 32 is displaced toward the right in FIG. 1 to be reduced compared to the prior art. In other words, a more flexurally rigid and stabler stand leg, and thus stand, is produced.

Figure 5:
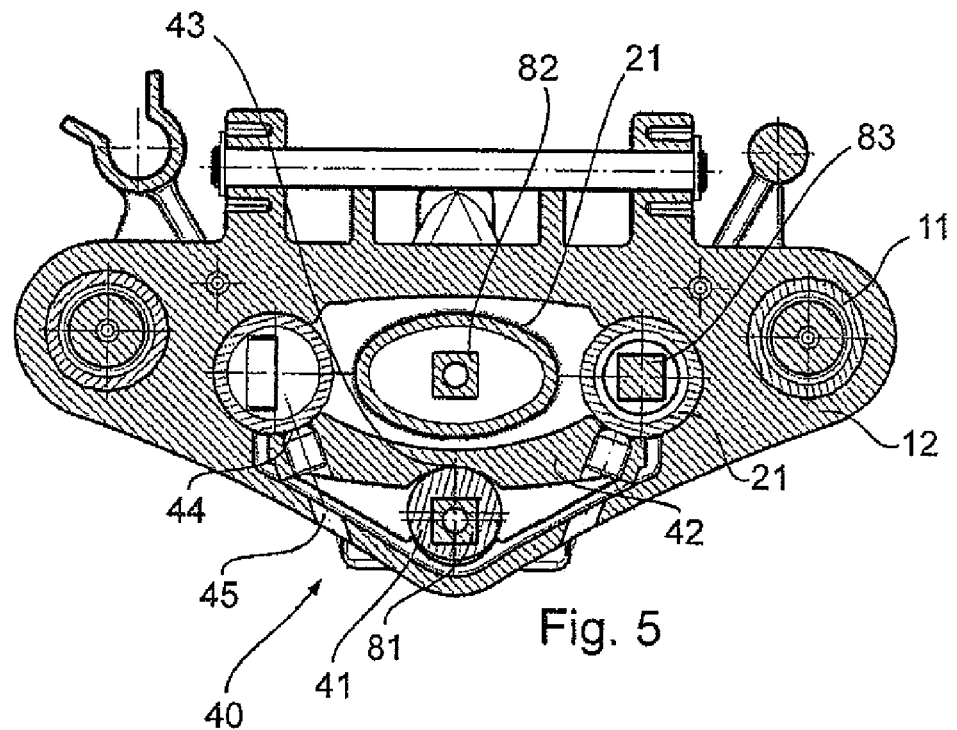
FIG. 5 is a cross section along the line C-C from FIG. 1.

The first locking mechanism 40 in the first crossmember 12 will be described hereinafter with reference to the cross section in FIG. 5. The first locking mechanism 40 comprises an eccentric 41. The eccentric 41 is rotatable relative to the first crossmember 12 and acts on a clamping element 42. The clamping element 42 is received in the first crossmember 12 so as to be displaceable in translation perpendicularly to the eccentric 41. The clamping element 42 has in this case, on the one hand, a recess 43 with which the eccentric 41 engages and, on the other hand, clamping faces 44 which can each be brought into engagement with the outer face of one of the second telescopic tubes 21 in order to effect the first crossmember 12 relative to the second telescopic tubes 21 by a force-transmitting connection between the clamping element 42 or the clamping faces 44 thereof and the second telescopic tubes 21 and thus a locking of the first telescopic unit T1 relative to the second telescopic unit T2 at a first clamping point. In order to make the clamping force adjustable, externally accessible setting means 45, in this case in the form of grub screws, which form the clamping face 44 are provided. By turning the grub screws 45, the grub screws are pressed more or less intensively against the outer face of the second telescopic tubes 21 while the position of the clamping element 42 remains the same.

Figure 7:
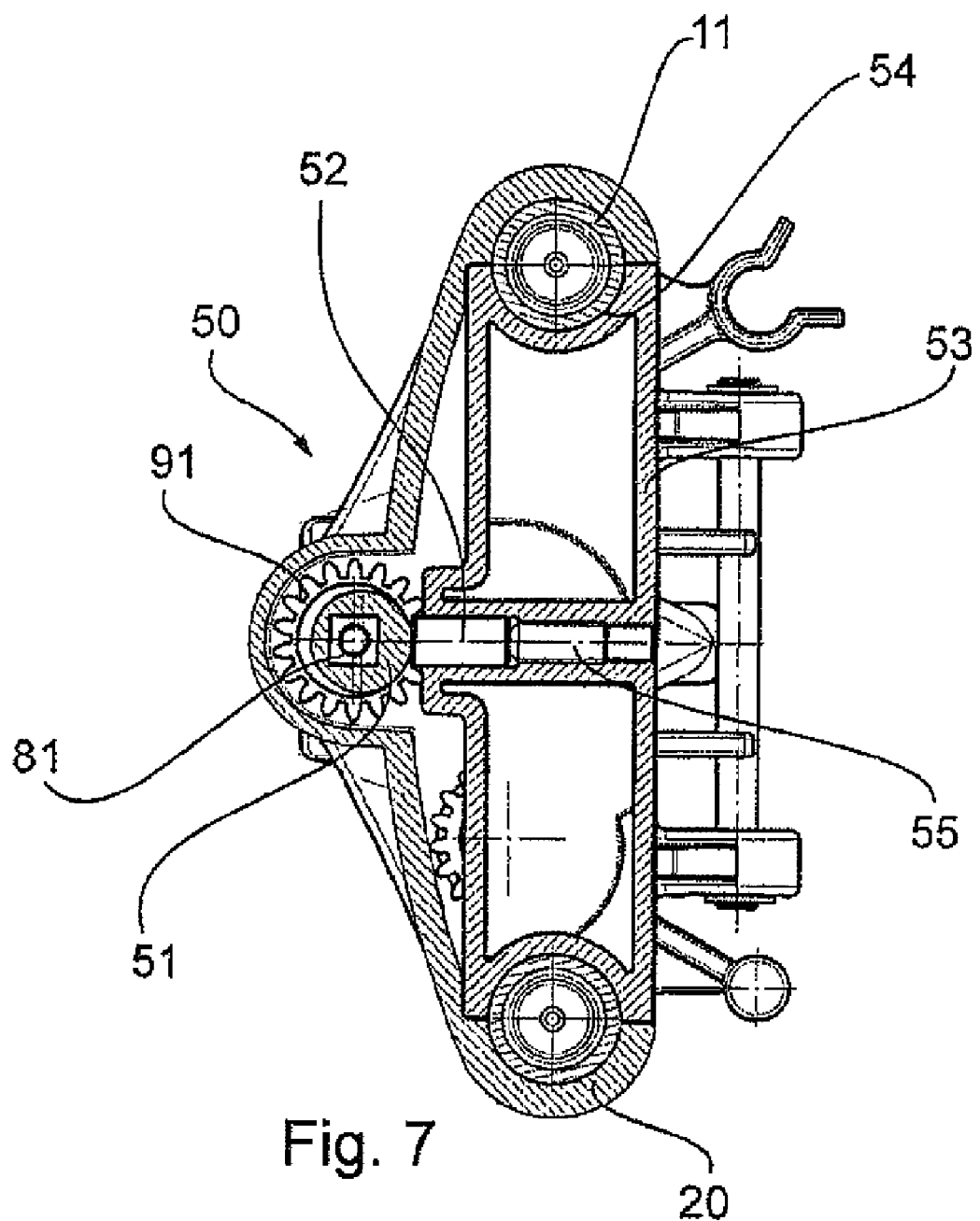
FIG. 7 is a cross section along the line H-H from FIG. 2.
Figure 11:
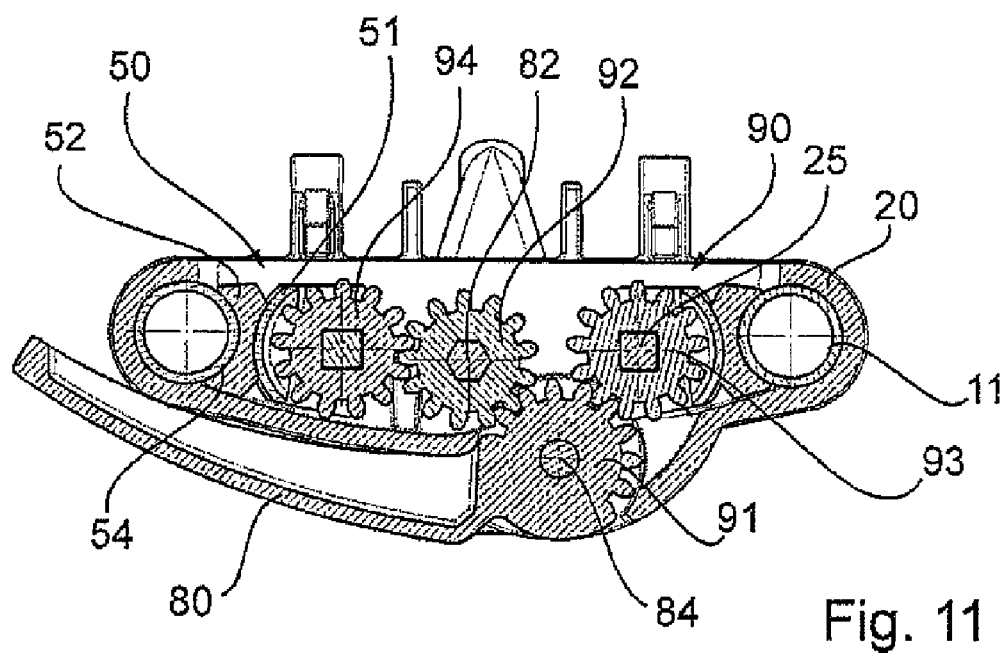
FIG. 11 is a cross section along the line B-B from FIG. 8.

The second locking mechanism 50 will be described hereinafter in greater detail with reference to the cross section in FIG. 7. The second locking mechanism 50 has an eccentric 51. The eccentric 51 is received in the second crossmember 20 and rotatable relative thereto. A pin 52, which interacts with the eccentric 51, is also provided in the second crossmember 20. The pin 52 is in this case displaceable in translation perpendicularly to the eccentric 51. Furthermore, the pin 52 is configured in a wedge-shaped or conical manner. Two clamping elements 53 are also provided in the second crossmember 20 so as to be displaceable in translation perpendicularly to the centre axis of the pin 52. In this case, the pin 52 interacts with mutually facing faces of the clamping elements 53 in such a way that the faces are displaced, on actuation of the eccentric 51, perpendicularly to the centre axis of the pin 52 and to the longitudinal extension L. The clamping elements each have a clamping face 54 which can be brought into engagement with the outer face of the first telescopic tubes 11, the clamping faces 54 surrounding the first telescopic tubes 11 around half of their circumference in the illustrated embodiment. Furthermore, an externally accessible setting means 55 is also provided in the second locking mechanism 50. In this case too, the setting device 55 is configured in the form of a grub screw which can be further screwed in or further unscrewed. The grub screw determines the path along which the pin 52 can be displaced by the eccentric and thus via the wedge-shaped or conical face, which interacts with the clamping elements 53, the path of the clamping elements 53 perpendicularly to the first telescopic tubes 11. This enables the clamping force of the clamping elements 53 acting on these tubes 11 to be determined.

Figure 6:
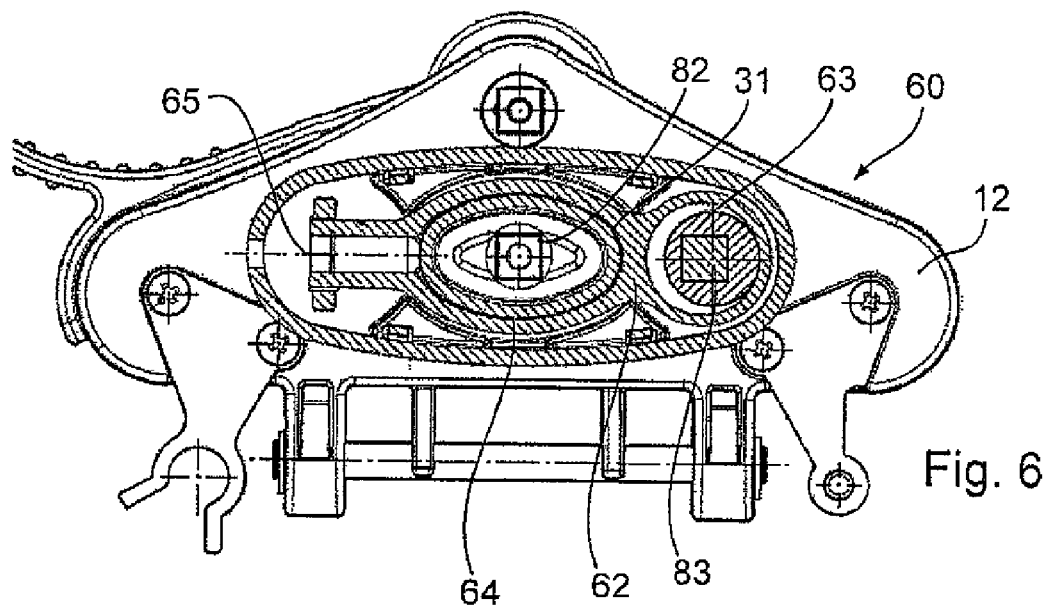
FIG. 6 is a cross section along the line F-F from FIG. 1.

The third locking mechanism 60 will be described hereinafter with reference to the section in FIG. 6. The third locking mechanism 60 also comprises an eccentric 61 which is mounted so as to be rotatable relative to the third crossmember 22. The eccentric 61 interacts in this case with a clamping element 62. The clamping element 62 has an eye 63 having an inner diameter which is larger than the outer diameter of the eccentric 61 and surrounds the eccentric 61 all the way round. Furthermore, the clamping element 62 has a clamping face 64 which can be brought into frictional engagement or force-transmitting engagement with the outer face of the third telescopic tube 31 in order to be able to lock the third crossmember 22 and thus the second telescopic unit T2 relative to the third telescopic tube 31 and thus the third telescopic unit T3. Furthermore, an externally accessible setting device 65, via which the force of the clamping can be set, is also provided here.

Figure 4:
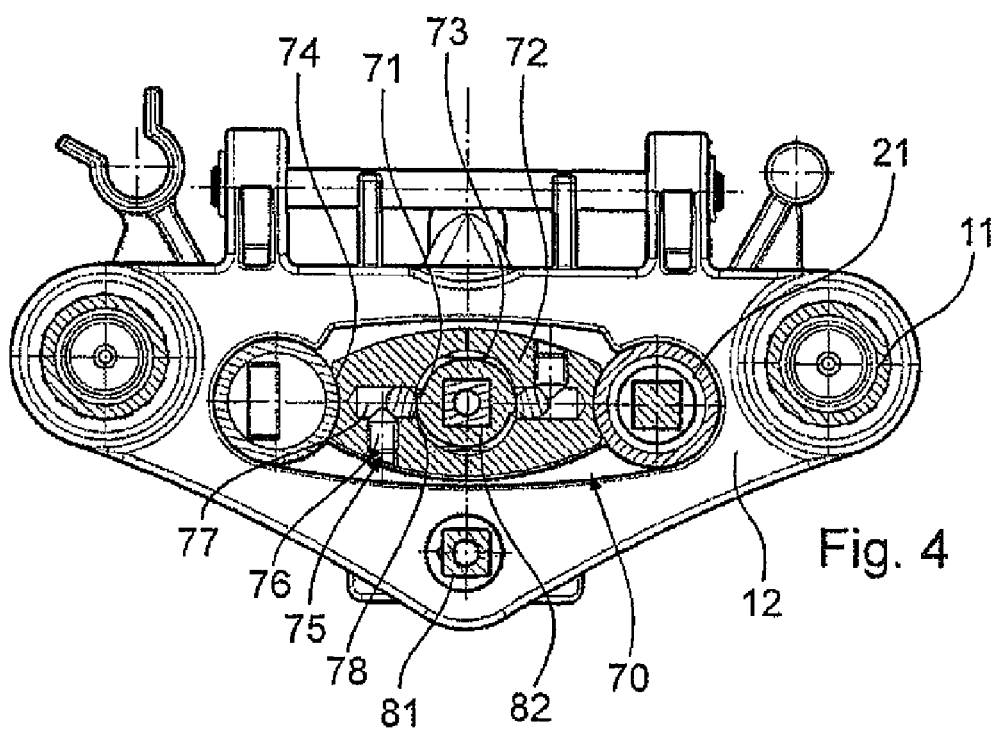
FIG. 4 is a cross section along the line B-B from FIG. 1.

The fourth locking mechanism 70 will be described hereinafter with reference to FIG. 4. The fourth locking mechanism 70 also comprises an eccentric 71, although this eccentric acts, in contrast to the eccentrics 41, 51, 61, on opposite sides. The eccentric 71 is rotatable relative to the fourth crossmember 30 and interacts with two opposingly arranged clamping elements 72. The clamping elements 72 are received by the fourth crossmember 30 so as to be displaceable in translation perpendicularly to the eccentric 71 and together define a recess 73 receiving the eccentric 71. On the opposite sides forming the recess 73, the clamping elements 72 have corresponding clamping faces 74 which can be brought into contact with the outer faces of the second telescopic tubes 21 in a force-transmitting manner in order to lock the second telescopic unit T2 relative to the third telescopic unit T3 at a fourth locking point. An externally accessible setting means 75, which allows the force at which the clamping faces 74 can be brought into engagement with the outer faces of the second telescopic tubes 21 to be set, is provided in this case too. A respective grub screw 76 and a ball 78, which is received in a channel 77 opening into the recess 73, are formed for this purpose.

Furthermore, the actuating mechanism connecting the locking mechanisms will be described hereinafter. In the illustrated embodiment, the actuating mechanism has a handle 80 in the form of an actuating lever which is pivotable about an axis parallel to the longitudinal direction L. The actuating lever 80 is in this case attached to the connecting piece 10, thus ensuring actuation of all the locking mechanisms at the top position of the illustrated leg and thus of the stand according to the invention. However, alternatively, it is also conceivable to attach the actuating lever 80 to the second crossmember 20. The actuating lever 80 is connected in a form-fitting manner to a torsion bar 81 (third coupling means), the torsion bar 81 likewise being rotatable about an axis parallel to the longitudinal direction L and preferably being configured as a square or polygon (see in this regard FIG. 4 or 5, for example). The torsion bar 81 runs in this case from the actuating means 80 for actuating the second locking mechanism 50 through the second crossmember 20 and from there up to the first crossmember 12 where the first locking mechanism can be actuated. For this purpose, the torsion bar 81 is connected in a form-fitting manner to the eccentric 51 of the second locking mechanism 50 (see FIG. 7), as a result of which the eccentric 51 rotates upon rotation of the torsion bar 81. Furthermore, the torsion bar 81 is connected in a form-fitting manner to the eccentric 41 of the first locking mechanism 40 in the first crossmember 12, so that the eccentric 41 is rotated upon rotation of the torsion bar 31. The torsion bar 31 enables the first and second locking mechanisms 40 and 50 respectively to be jointly actuated via just one actuating lever 80 at a position which is as high as possible, preferably the top position.

Furthermore, the actuating mechanism comprises a transmission means which is shown in greater detail in section in FIG. 3. In the illustrated embodiment, the transmission means consists of a plurality of gear wheels, although it can also be formed from control cams, rod assemblies, belts, in particular toothed belts, etc.

In this case, a first gear wheel 91 is connected in a form-fitting manner to the torsion bar 81 and thus rotates together with the torsion bar 81 and the eccentrics 41 and 51 of the locking mechanisms 40 and 50.

The first gear wheel 91 meshes with a second gear wheel 92, the centre axis of which is oriented or aligned with the centre axis of the third telescopic tube 31. A further torsion bar 82 (first coupling means) is connected to this second gear wheel 92 and rotates together therewith. The further torsion bar 32 runs in this case, as may be seen from the section in FIG. 2, in the third telescopic tube 31 when the telescopic units T1 to T3 are telescoped. The further torsion bar 82 is connected in a form-fitting manner to the eccentric 71 of the fourth locking mechanism 70, so that the eccentric 71 rotates and the fourth locking mechanism 70 is actuated upon rotation of the torsion bar 82. In this case, the eccentric 71 is displaceable in the longitudinal direction L on the further torsion bar 82. The further torsion bar 32 is also configured as a square or polygon in order to be able to achieve a form-fitting connection to the eccentric 71 and an effective transmission of torque.

Furthermore, the transmission mechanism 90 has, with reference to FIG. 3, a third gear wheel 93 having a smaller diameter and a fourth gear wheel 94, the third gear wheel 93 meshing with the second gear wheel 92 and the fourth gear wheel 94. The fourth gear wheel 94 is arranged with its centre point aligned with the centre axis of a second telescopic tube 21. The fourth gear wheel 94 is connected to a further torsion bar 83 (second coupling means) which is likewise configured, as may be seen from FIGS. 5 and 6, as a square or polygon. The torsion bar 83 is connected in a form-fitting manner to the eccentric 61 of the third locking mechanism in the third crossmember 22, so that a rotation of the torsion bar 83 leads to a rotation of the eccentric 61 and thus to actuation of the locking mechanism 60. The torsion bar 83 is in this case received, as may be seen in particular from FIG. 5, in one of the second telescopic tubes 21 and protected thereby.

The transmission mechanism 90 also transmits a single actuation of the actuating lever 80, which acts directly on the torsion bar 81, to the torsion bars 82, 83. In other words, a rotation of the handle 80 is converted into a rotation of all three torsion bars 81-83.

The mode of operation will briefly be described hereinafter.

If a user wishes to extend the stand leg, such as is shown fully telescoped in FIG. 1, into a desired position, then the actuating lever 80 is swivelled away from the stand leg. This causes rotation of the torsion bar 81 which acts on the eccentric 41, 51. In this case, the eccentrics move out of the locking positions shown in FIGS. 5 and 7 into the release position, thus disengaging the clamping faces 54 and 44 respectively of the locking mechanisms from the first and second telescopic tubes 11 and 21 respectively. This allows displacement of the second telescopic unit T2 in relation to the first telescopic unit T1 in the longitudinal direction L. Furthermore, on the foregoing actuation of the handle 80, the gear wheels 91, 92 transmit the rotation of the handle 80 to the same degree, if appropriate in stepped-up or stepped-down form, to the torsion bar 82. As a result, the eccentric 71 of the fourth locking mechanism is also rotated, causing disengagement of the clamping elements 72 from the second telescopic tubes 21. Furthermore, the rotation of the actuating lever 80 is transmitted to the torsion bar 83 via the gear wheels 91, 92, 93 and 94 and, as a result, the eccentric 61 of the third locking mechanism is rotated, causing disengagement of the clamping face 64 from the third telescopic tube 31. Locking points three and four, which are formed by the third and fourth locking mechanisms 60 and 70 respectively, are thus also released and displacement of the third telescopic unit T3 relative to the second telescopic unit T2 is possible.

The consumer can now set the telescopic portions T1, T2 and T3 in a desired position relative to one another. For locking, the actuating lever 80 is pivoted back into the position shown in FIG. 1, as a result of which the eccentrics 41, 51, 61 and 71 are, again, rotated simultaneously and the clamping faces 44, 54, 64 and 74 are brought into engagement with the outer faces of the corresponding telescopic tubes via the torsion bars 81 to 83. The telescopic units T1 to T3 are thus locked relative to one another and cannot be displaced any further. In addition, the telescopic units T1 and T2 are locked in relation to each other on the first crossmember 12 and on the second crossmember 20, as is the telescopic unit T2 in relation to the telescopic unit T3 on the third crossmember 22 and also the fourth crossmember 30. There are thus four clamping points which are set apart in the longitudinal direction and lead to increased stability and rigidity of the extended stand leg.

As was mentioned at the outset, it is also possible to provide the actuating lever 80 on the crossmember 20 rather than on the connecting piece 10. In order to prevent the torsion bar 81 from being exposed, it would then be conceivable to transmit, instead of the direct coupling of the actuating lever 80, the actuating movement to the torsion bar 81 via further gear wheels as in the torsion bars 82, 83. In addition, it would in this case be preferable to accommodate the torsion bar 81, like the torsion bar 83, in one of the first telescopic tubes 11.

The leg of a stand according to the invention in accordance with a second embodiment of the present invention will be described hereinafter with reference to FIGS. 8 to 14. In order to avoid repetitions, elements which are the same as in the first embodiment will not be described again.

Figure 12:
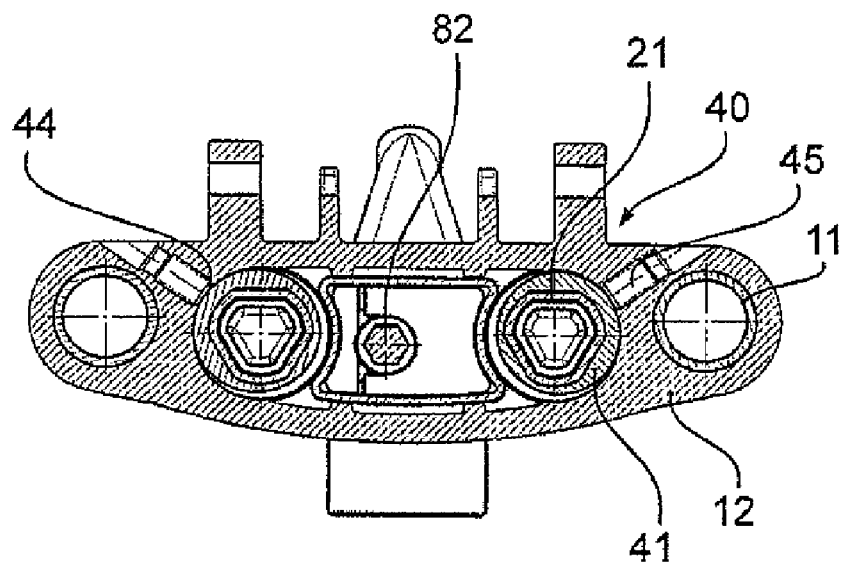
FIG. 12 is a cross section along the line C-C from FIG. 8.
Figure 13:
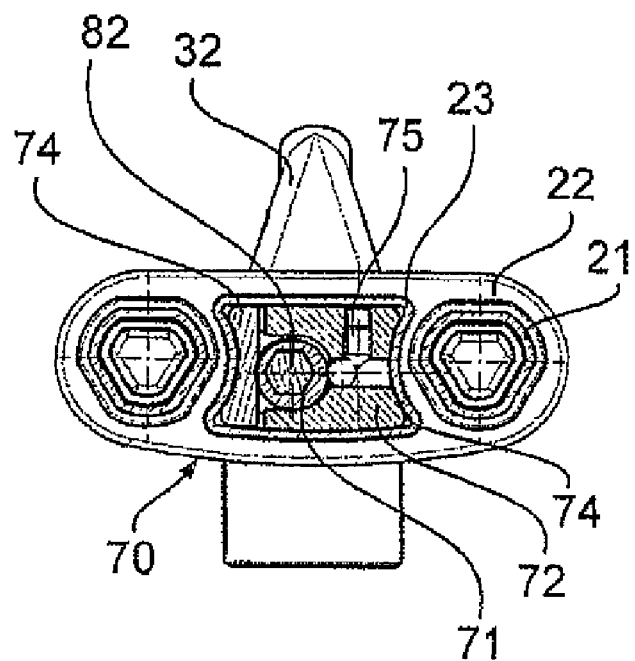
FIG. 13 is a cross section along the line E-E from FIG. 8.
Figure 14:
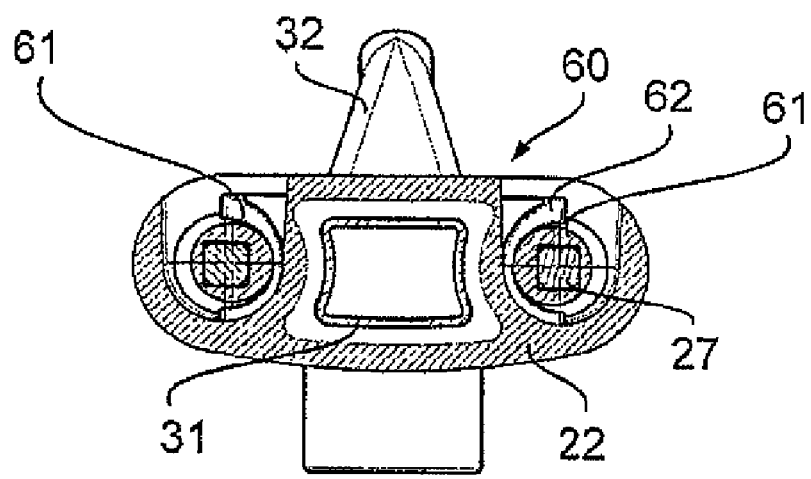
FIG. 14 is a cross section along the line D-D from FIG. 8.

In the second embodiment, the second telescopic tubes 21 of the second telescopic unit T2 are configured so as to be triangular in cross section with rounded-off edges (see for example FIGS. 12 and 13). The second telescopic tubes 21 are in this case provided at their two opposing ends with caps 24, 26 each having bolt-like projections 25, 27 extending in opposite directions in the longitudinal direction L of the leg. These bolt-like extensions 25, 27 are embodied as a square in cross section (see for example FIGS. 11 and 14) but can also be configured as a polygon. The second telescopic tubes 21 are mounted in the region of their caps 24, 26 in the second crossmember 20 or the third crossmember 22 so as to be rotatable via bearings 29. A housing 23 is arranged between the two telescopic units 21 and immovably connected to the second crossmember 20 and the third crossmember 22. The housing 23 has an inner dimension or contour corresponding substantially to the outer dimension or contour of the third telescopic tube 31. The third telescopic tube 31 is guided via the fourth crossmember 30 and received in this housing 23 so as to be displaceable in the longitudinal direction L.

The outer face of the third telescopic tube 31, or the cross section thereof, is in this case configured in such a way that the tube has, in contrast to the oval cross section from the first embodiment, a "square" cross section, sides respectively facing the second telescopic tubes 21 being provided with an inwardly directed curvature (concavity).

The first locking mechanism 40 is provided in the first crossmember 12. As in the first embodiment, it has an eccentric 41. However, in the second embodiment, two eccentrics 41 are provided and each connected to the two second telescopic tubes 21 in a form-fitting manner and can rotate together with the second telescopic tubes 21. In addition, the two eccentrics 41 are at the same time configured as clamping elements and have a clamping face 44 which can be brought into engagement with a corresponding mating face formed by the first crossmember 12, such as is illustrated in FIG. 12. The clamping force can in this case also be set, as in the first embodiment, in an externally accessible manner via a setting means 45.

Likewise, the second locking mechanism 50 has two eccentrics 51 which act on clamping elements 52. The clamping elements 52 each have a clamping face 54 which can be brought into engagement with the outer faces of the first telescopic tubes 11.

The third locking mechanism 60 also has two eccentrics 61 which, as in embodiment 1 above, are rotatable relative to the third crossmember 22. These eccentrics 61 act on clamping elements 62, the clamping faces 64 of which (FIG. 10) can be pressed onto the outer face of the curved sides of the third telescopic tube 31 in order to effect frictionally engaged clamping of the third telescopic tube 31 (of the third telescopic unit T3) relative to the third crossmember 22 (second telescopic unit T2).

The fourth clamping mechanism, which is received by the fourth crossmember 30 (FIG. 10), is formed by an eccentric 71 which acts on two clamping elements 72 which can be displaced in translation in the direction of the inner face of the housing 23. In this case, the clamping elements 72 are displaceable perpendicularly to the direction of rotation of the eccentric and their clamping faces 74 are pressed, as a result of a rotation of the eccentric 71, against the likewise curved lateral inner faces of the housing 23 of the second telescopic unit T2, thus effecting a further clamping point or locking point between the second telescopic unit T2 and the third telescopic unit T3.

The actuating mechanism of the second embodiment likewise has an actuating lever 80, although this is part of the transmission means 90. The actuating lever is received in the second crossmember 20 so as to be rotatable about an axis 84 and has a first partial gear wheel 91. The first partial gear wheel 91 meshes with a second gear wheel 92 and a third gear wheel 93. The second gear wheel 92, for its part, meshes with a fourth gear wheel 94, the gear wheels each being rotatably received in the second crossmember 20.

The third and fourth gear wheels 93 and 94 respectively are connected to the bolt-like extensions 25 of the second telescopic tubes 21, so that a rotation of the gear wheels 93 and 94 leads to a rotation of the second telescopic tubes 21. In order not to have to transmit the torsional loads during locking via the second telescopic tubes 21, and thus to have to make these telescopic tubes accordingly strong, a respective torsion bar 28, which is intended to transmit the torque, connects the caps 24 and 26. The second gear wheel is connected in a form-fitting manner to a torsion bar 82 which is received in the longitudinal direction L in the housing 23 and, in particular when telescoped, in the third telescopic tube 31. A rotation of the second gear wheel 92 thus leads likewise to a rotation of the torsion bar 82. The torsion bar 82 thus connects the second crossmember 20 to the fourth locking mechanism and thus forms the first coupling means in this embodiment. The rotatable telescopic tubes 21 form a connection between the second crossmember and the first locking mechanism 40 in the first crossmember 12 and also the third locking mechanism 60 in the third crossmember 22. The rotatable second telescopic tubes 21 thus jointly form the second and third coupling means.

The mode of operation of the leg of the second embodiment will briefly be described hereinafter. If all the locking points are to be released, in order to be able to extend or retract the stand leg, the actuating lever 80 is swivelled in FIG. 8 away from the illustrated leg about the axis 84. This swivelling, and the rotation associated therewith of the first gear wheel 91, causes the gear wheels 93 and 94 to rotate (the latter via the gear wheel 92). This rotation leads, via the bolt-like extensions 25, to a rotation of the second telescopic tubes 21. If the second telescopic tubes 21 are rotated, the eccentrics 41 and 61 rotate at the same time. This releases the locking mechanisms 40 and 60. At the same time as this rotation, the eccentrics 51, which are connected to the gear wheels 93, 94, of the second locking mechanism are rotated and the second locking mechanism 50 is released on the second crossmember 20. Furthermore, a rotation of the actuating lever 80 causes rotation of the gear wheel 93 and thus of the torsion bar 82 which in the illustrated embodiment is configured as a polygon. This rotation causes a rotation of the eccentric 71 and a release of the locking mechanism 70. All the locking points are thus released and the telescopic units T1 to T3 can be displaced relative to one another into the desired position.

For the purposes of locking, the user moves the actuating lever 80 back into the starting position shown in FIG. 8. In this case, the gear wheels 92, 93 and 94 rotate in the opposite direction. During this movement, the eccentrics 41, 51, 61, 71 are moved into the clamping position. At the same time, the eccentrics 41 also form the clamping element and enter at their clamping face 44 into engagement with an inner face of the first crossmember 12, thus causing a first clamping of the second telescopic unit T2 with the first telescopic unit T1. Furthermore, the eccentrics 51 enter into engagement with the clamping elements 52 and press the clamping faces 54 of the clamping elements 52 against the outer faces of the first telescopic tubes 11, allowing a second clamping of the second telescopic unit T2 relative to the first telescopic unit T1, albeit at a distance in the longitudinal direction L from the first.

Furthermore, the eccentric 61, which is connected to the extensions 27 of the caps 26 of the second telescopic tubes 21, is rotated by rotation of the telescopic tubes 21, triggered via the gear wheels 93, 94, and presses the clamping faces 64 of the clamping elements 62 against the outer face of the third telescopic tube 31, as a result of which a first clamping point between the second telescopic unit T2 and the third telescopic unit T3 is reached. Finally, the eccentric 71 of the fourth locking mechanism 70 is rotated via the gear wheel 92 and the torsion bar 82 and presses the clamping faces 74 of the clamping elements 72 against the inner face of the housing 23 (second leg portion) of the second telescopic unit T2. The fourth locking mechanism 70, which is arranged in the fourth crossmember 30, thus leads to a further locking point between the second telescopic unit T2 and the third telescopic unit T3, although this clamping point is positioned at a distance in the longitudinal direction L from the third locking point.

Thus, the telescopic units T1 to T3 are each locked at two points which are set apart from each other in the longitudinal direction L, as a result of which the rigidity and stability of the stand leg, and thus of the stand, is increased in the same manner as in the foregoing first embodiment.

The second embodiment is advantageous over the first embodiment in so far as no transmission member, and in particular no coupling rod, is exposed, be it in the fully extended or in the telescoped state. This protects the corresponding transmission members or coupling means and few gaps are formed.

It goes without saying that the above-illustrated embodiments are merely two possible ways of carrying out the present invention and that the person skilled in the art will perceive a broad range of modifications and alterations, although these realise the basic idea of the present invention, such as is defined in the following patent claims. In addition, it will be clear that individual features of the embodiments may also be combined with one another provided that they are not mutually contradictory. For example, it is also conceivable in the embodiment in FIG. 1 to guide the third telescopic unit T3 or the telescopic tube 31 thereof in a housing 23, as in the second embodiment. In addition, it is also conceivable to divide the actuating lever 80 in two, i.e. perpendicularly to the axis of rotation 84, for example, and to use one part of the lever for the locking mechanisms 40, 50 and the other for the locking mechanisms 60, 70, so that the telescopic units T1 and T2 and T2 and T3 respectively are also displaceable and can be locked in isolation from one another without having to release the locking of the other units. In addition, it is also conceivable to configure the coupling means not by torsion bars or other rotating elements (for example the telescopic tubes 21 of the second embodiment), but rather by limp elements, such as for example wire cables, which interact with the corresponding locking mechanisms. It would also be conceivable to perform, instead of the rotatory movement of the bars, a tensile or compressive force, i.e. a translatory movement, in the longitudinal direction L in order to actuate the locking mechanisms. In addition, the present invention is not limited to three-stage stands, but can also be used in single or three or multiple-stage stands.

The invention claimed is:

1. A camera stand for mounting a camera, comprising a receptacle and at least one leg which is connected to the receptacle and comprises at least two telescopic units, of which a first telescopic unit is connected to the receptacle and a second telescopic unit is displaceable relative to the first telescopic unit and can be locked in a desired position in relation to the first telescopic unit, wherein two locking points set apart in the longitudinal direction of the leg are provided between the second telescopic unit and the first telescopic unit for locking the telescopic units, in which the leg also has a third telescopic unit which is displaceable in relation to the second telescopic unit and can be locked in a desired position in relation to the second telescopic unit, wherein two locking points set apart in the longitudinal direction of the leg are provided between the third telescopic unit and the second telescopic unit for locking the telescopic units, and in which the third telescopic unit comprises a foot and a fourth crossmember, which is supported on the second leg portion for guiding the third telescopic unit, and at least a third elongate leg portion, wherein a first locking point between the third telescopic unit and the second telescopic unit is formed by a third locking mechanism which is received by the third crossmember and a fourth locking point between the third telescopic unit and the second telescopic unit is formed by a fourth locking mechanism which is received by the fourth crossmember.

2. Stand according to claim 1, in which the first telescopic unit comprises a connecting piece for connecting to the receptacle, a first crossmember and a first elongate leg portion which is connected to the connecting piece and the first crossmember, the second telescopic unit comprises a second crossmember which is supported on the first leg portion for guiding the second telescopic unit, a third crossmember and a second elongate leg portion which is connected to the second and the third crossmember, wherein a first locking point between the first telescopic unit and the second telescopic unit is formed by a first locking mechanism which is received by the first crossmember and a second locking point between the first telescopic unit and the second telescopic unit is formed by a second locking mechanism which is received by the second crossmember.

3. Stand according to claim 1, wherein a first coupling means connects the second crossmember to the fourth locking mechanism.

4. Stand according to claim 3, wherein the first coupling means is received in a housing of the second leg portion in which the third leg portion is guided.

5. Stand according to claim 1, wherein a second coupling means connects the second crossmember to the third locking mechanism.

6. Stand according to claim 5, wherein the second coupling means is received in the second leg portion.

7. Stand according to claim 1, wherein the third and the fourth locking mechanism can be actuated jointly with the first and the second locking mechanism.

8. A camera stand for mounting a camera, comprising a receptacle and at least one leg which is connected to the receptacle and comprises at least two telescopic units, of which a first telescopic unit is connected to the receptacle and a second telescopic unit is displaceable relative to the first telescopic unit and can be locked in a desired position in relation to the first telescopic unit, wherein two locking points set apart in the longitudinal direction of the leg are provided between the second telescopic unit and the first telescopic unit for locking the telescopic units, in which the first telescopic unit comprises a connecting piece for connecting to the receptacle, a first crossmember and a first elongate leg portion which is connected to the connecting piece and the first crossmember, the second telescopic unit comprises a second crossmember which is supported on the first leg portion for guiding the second telescopic unit, a third crossmember and a second elongate leg portion which is connected to the second and the third crossmember, wherein a first locking point between the first telescopic unit and the second telescopic unit is formed by a first locking mechanism which is received by the first crossmember and a second locking point between the first telescopic unit and the second telescopic unit is formed by a second locking mechanism which is received by the second crossmember, wherein the first and the second locking mechanism, which are connected via a third coupling means, can be actuated jointly.

9. Stand according to claim 8, further comprising a handle which is provided on the second crossmember and interacts with the third coupling means, wherein the third coupling means runs in the first leg portion.

10. Stand according to claim 8, further comprising a handle which is provided on the second crossmember and interacts with the third coupling means, wherein the third coupling means is formed by the second leg portion, for which purpose the second leg portion is mounted, preferably rotatably, in the second and third crossmember.

11. Stand according to claim 8, further comprising a handle which is provided on the connecting piece and interacts with the third coupling means, wherein the second crossmember is longitudinally displaceable relative to the third coupling means.

12. Stand according to claim 11, wherein the third coupling means is fastened to the handle.

13. Stand according to claim 8, further comprising a transmission means for transmitting a movement of the handle to at least one of the coupling means.

14. Stand according to claim 4, wherein the first and the second locking mechanism, which are connected via a third coupling means, can be actuated jointly and wherein the second coupling means is formed by the third coupling means.

15. Stand according to claim 8, further comprising a transmission means for transmitting a movement of the handle to two of the coupling means.

16. Stand according to claim 8, further comprising a transmission means for transmitting a movement of the handle to all the coupling means.

* * * * *